Patented Apr. 5, 1949

2,466,040

UNITED STATES PATENT OFFICE 2,466,040

METHOD OF AND A MOLDING COMPOSITION FOR USE IN MAKING ORAL SUPPORTS

Simon Myerson, Brookline, Mass.

No Drawing. Application April 23, 1947,
Serial No. 743,464

4 Claims. (Cl. 260—2)

This invention relates to a method of, and a moulding composition for use in, making oral supports for artificial teeth and more particularly such supports made of synthetic resin. Such oral supports, in the form of a bridge or denture, are commonly made of synthetic resins the most popular of which is polymethyl methacrylate.

To simulate the visual effect of the human gum, metallic oxides or other coloring materials have been coated on the surface of the granules of a clear colorless polymer of a synthetic resin, for example by tumbling in a container a mixture of such granules and a powdered coloring material. A mouldable mass is formed from such coated granules by mixing about three parts thereof by volume with one part by volume of a liquid monomer of the synthetic resin or of a compatible synthetic resin.

To form an upper denture, for example, a sufficient quantity of this mouldable mass is usually packed in a flask to cover the necks of the teeth and to form the palate and lateral sides of the denture base or support. During the moulding process a considerable percentage of the synthetic resin particles lose their coating of coloring material thereby creating on the surface of the denture base a stippled or mottled effect. However, during such process the liquid monomer often picks up coloring materials from the surfaces of the synthetic resin granules in an undesirable manner so as to create streaks of clear areas and streaks or "runs" of intense color in the oral support. Moreover, where synthetic resin artificial teeth are used, the teeth often become permanently stained with coloring materials carried by the monomer.

A synthetic resin granule having the coloring material distributed throughout its interior as well as upon its surface may be provided by adding a dye or pigment to the synthetic resin while it is in fluid or liquid form and prior to granulation. For example a pink dye or pigment may be added to the resin prior to polymerization, or in the early stages thereof. Other methods of thus incorporating the color in the synthetic resin material prior to the formation of granules are known to persons skilled in the art. When the term "granules of colored synthetic resin" is used herein I mean granules of synthetic resin wherein the coloring material is distributed both interiorly and on the surface thereof as distinguished from only a surface distribution or coating.

When granules of such a colored synthetic resin are used to make an oral support, addition of the monomer does not cause the color to flow so as to stain the teeth or to cause "streaks" or "runs" in the oral support, but the oral support does not have the desired mottled effect because it presents a uniformly pink appearance rather than a mottled appearance.

The present invention has for one of its objects the provision of a synthetic resin moulding composition and a method of making oral supports for artificial teeth which eliminate the aforesaid defects of the compositions and methods now in use.

A further object is the provision of such a moulding composition and method whereby the mottled effect and the ratio of clear to colored areas may be accurately controlled.

A further object is the provision of such a composition and method which provide an oral support which is free from streaks of clear areas or of colored areas such as are caused by "runs."

A further object is the provision of such a moulding composition and method which produce an oral support which closely simulates the appearance of the human gum.

A further object is the provision of such a composition and method which present a substantially uniform mottled visual effect of pink and substantially clear colorless areas but without presenting a mechanically uniform mottled visual effect.

Another object is the provision of such a composition and method which are economical in use and are capable of economical manufacture.

Other objects and advantages will be apparent from the following description.

According to the preferred embodiment of this invention, I mix an appropriate quantity of granules of a pink colored synthetic resin with an appropriate quantity of granules of a clear substantially colorless synthetic resin, said synthetic resins being selected from useable denture base forming synthetic resins which are normally hard, tough and non-brittle so as to form a hard, tough, non-brittle oral support when treated with a compatible plasticizer and moulded and cured in the manner which is now common in the fabrication of oral supports. For use in making a denture this mixture of polymers is combined in the usual manner with a compatible monomer (or other plasticizer) to form a mouldable mass. This mass may then be packed around the gingival ends of the artificial teeth in a flask and processed in the manner usual in the art. This provides an artificial denture in which the oral support has pink areas and clear areas and the visual effect is a surface substantially uniformly mottled with pink and clear areas but without presenting a mechanically uniform mottled effect.

Instead of a pink colored synthetic resin, granules of a plurality of different colored synthetic resins may be used to provide the desired shade or shades.

By varying the sizes of, and the relative amounts of, the pink and clear granules, the respective sizes of the pink and clear areas in the completed oral support may be varied to any extent desired. For example, I have found that a moulding composition consisting of about 50% by weight of pink colored synthetic resin granules and 50% by weight of larger substantially clear colorless synthetic resin granules, when mixed with a compatible monomer produces a denture base material which closely simulates the appearance of the gums of a very large proportion of patients. By the use of one or two alternative mixtures the requirements of practically all patients may be satisfied.

While I prefer to use granules of a thermoplastic denture base forming synthetic resin such as the polymethacrylates and polystyrene, copolymers thereof with each other and copolymers thereof with appropriate thermohardening synthetic resins such as allyl methacrylate, methallyl methacrylate or divinyl benzene may also be used, each of said resultant copolymers being granular, normally hard, tough and non-brittle and capable of being moulded as hereinafter described by the addition of a suitable plasticizer as is known in the art.

I have found that the moulding composition preferably comprises from 40 to 60 parts by weight of granules of colored synthetic resin and from 60 to 40 parts by weight of granules of substantially clear, colorless synthetic resin.

Resin polymer granules as manufactured are not uniform in size and it is not practical to use particles of one uniform size, nor is it necessary. Preferably the granules of colored synthetic resin have a range of particle sizes smaller on the average than that of the granules of the clear colorless synthetic resin. I prefer however that the granules of the colored synthetic resin substantially have a range of particle sizes of from .005 to .015 inch inclusive in diameter (i. e. in minimum and maximum transverse particle sizes but not necessarily spherical in shape) and that the granules of the clear synthetic resin have a range of particle sizes from .010 to .025 inch inclusive in diameter (i. e. in minimum and maximum transverse particle sizes but not necessarily spherical in shape).

A specific example utilizing polymethyl methacrylate is as follows: Mix 50 parts by weight of pink colored methyl methacrylate polymer granules of the range of sizes above described with 50 parts by weight of substantially clear and colorless methyl methacrylate polymer granules of the range of sizes above described. To such a mixture add approximately one part of methyl methacrylate monomer by volume to three parts of said polymer mixture by volume. This produces a plastic or mouldable mass. Pack this mass in a flask so that it is flowed around the gingival ends of the artificial teeth and forms the palate and the gums of a denture in the manner which is well known in the art. Close the flask, apply pressure (the pressure of the ordinary dental laboratory hand screw press is sufficient), place the flask in a clamp—e. g. a C clamp—and in water at a temperature of 170° F. for 1½ hours. Then cool the flask (usually in running water), open it and remove the cured denture. The denture is then polished.

In the manufacture of fine polymer granules of resins it is difficult to exclude a small percentage of particles below the desired minimum particle size; also a small percentage of particles above the desired maximum size may be present in the composition. Such small percentages of small and/or large particles may be introduced without materially altering the desired effects of this invention.

It will be apparent to persons skilled in the art that my novel moulding composition and method are equally adaptable for use with ceramic and synthetic resin artificial teeth, that they eliminate the stated defects of the prior art compositions and methods and that they produce an oral support whose visual effects may be more closely controlled and which more closely simulates the appearance of the human gum than has heretofore been possible. It will also be apparent to persons skilled in the art that this moulding composition is economical in use and is capable of economical manufacture.

While certain desirable embodiments of the invention have been illustrated by way of example it is to be understood that the invention is not limited to these embodiments but is to be regarded as broadly inclusive of any and all equivalents such as fall within the scope of the appended claims.

I claim:

1. A moulding composition for use in making a denture base, said moulding composition comprising from about 40 per cent to about 60 per cent by weight of granules of a denture base forming synthetic resin which is normally hard, tough and non-brittle, said granules having a coloring material distributed interiorly thereof, and from about 40 per cent to about 60 per cent by weight of granules of a substantially clear, colorless denture base forming synthetic resin which is normally hard, tough and non-brittle, said mixture comprising at least about 40 per cent by weight of said clear colorless granules which have transverse particle sizes of not substantially less than .010 inch and not substantially greater than .025 inch.

2. A moulding composition for use in making a denture base, said moulding composition comprising from about 40 per cent to about 60 per cent by weight of granules of a denture base forming synthetic resin which is normally hard, tough and non-brittle, said granules having a coloring material distributed interiorly thereof and transverse particle sizes of not substantially greater than .015 inch, and from about 40 per cent to about 60 per cent by weight of granules of a substantially clear, colorless denture base forming synthetic resin which is normally hard, tough and non-brittle, said mixture comprising at least about 40 per cent by weight of said colorless granules which have transverse particle sizes of not substantially less than .010 inch and not substantially greater than .025 inch.

3. Method of making a denture base comprising mixing from about 40 per cent to about 60 per cent by weight of granules of a denture base forming synthetic resin which is normally hard, tough and non-brittle, said granules having a coloring material distributed interiorly thereof, with from about 40 per cent to about 60 per cent by weight of granules of a substantially clear, colorless denture base forming synthetic resin which is normally hard, tough and non-brittle, said mixture comprising at least about 40 per cent by weight of said clear, colorless granules which have transverse particle sizes of not substantially less than .010 inch and not substantially greater than .025 inch, adding a compatible plasticizer so as to produce a mouldable mass and moulding the mass to the desired shape.

4. Method of making a denture base comprising mixing from about 40 per cent to about 60 per cent by weight of granules of a denture base forming synthetic resin which is normally hard, tough and non-brittle, said granules having a coloring material distributed interiorly thereof and transverse particle sizes of not substantially greater than .015 inch, with from about 40 per cent to about 60 per cent by weight of granules of a substantially clear, colorless denture base forming synthetic resin which is normally hard, tough and non-brittle, said mixture comprising at least about 40 per cent by weight of said clear, colorless granules which have transverse particle sizes of not substantially less than .010 inch and not substantially greater than .025 inch, adding a compatible plasticizer so as to produce a mouldable mass and moulding the same to the desired shape.

SIMON MYERSON.

REFERENCES CITED

The following references are of record in the file of this patent:

UNITED STATES PATENTS

| Number | Name | Date |
|---|---|---|
| 2,379,237 | Jenkins | June 26, 1945 |

FOREIGN PATENTS

| Number | Country | Date |
|---|---|---|
| 564,701 | Great Britain | Oct. 10, 1944 |

OTHER REFERENCES

Tylman & Peyton, "Acrylics and Other Dental Resins," J. B. Lippincott Co., Phil., Pa. (1946), page 213.